US012072648B2

(12) United States Patent
Rokutan et al.

(10) Patent No.: US 12,072,648 B2
(45) Date of Patent: Aug. 27, 2024

(54) CONDUCTIVE ROLLER, TRANSFER DEVICE, PROCESS CARTRIDGE, AND IMAGE FORMING APPARATUS

(71) Applicant: FUJIFILM Business Innovation Corp., Tokyo (JP)

(72) Inventors: Minoru Rokutan, Kanagawa (JP); Shogo Hayashi, Kanagawa (JP); Takuro Hoshio, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 40 days.

(21) Appl. No.: 17/971,092

(22) Filed: Oct. 21, 2022

(65) Prior Publication Data

US 2023/0384716 A1 Nov. 30, 2023

(30) Foreign Application Priority Data

May 26, 2022 (JP) ................................. 2022-086217

(51) Int. Cl.
*G03G 15/16* (2006.01)

(52) U.S. Cl.
CPC ..... *G03G 15/1665* (2013.01); *G03G 15/1685* (2013.01)

(58) Field of Classification Search
CPC ........... G03G 15/0225; G03G 15/0233; G03G 15/1665; G03G 15/1685
See application file for complete search history.

(56) References Cited

U.S. PATENT DOCUMENTS

| | | | | |
|---|---|---|---|---|
| 2004/0033091 | A1* | 2/2004 | Saito | G03G 15/1685 399/313 |
| 2005/0220478 | A1* | 10/2005 | Ai | G03G 15/1605 399/101 |
| 2017/0160654 | A1* | 6/2017 | Arimura | G03G 15/0812 |
| 2018/0373178 | A1* | 12/2018 | Sato | G03G 15/0808 |
| 2022/0404724 | A1* | 12/2022 | Shimizu | G03G 5/0567 |

FOREIGN PATENT DOCUMENTS

| | | | |
|---|---|---|---|
| JP | 2009-244824 | A | 10/2009 |
| JP | 2010-139832 | A | 6/2010 |
| JP | 5435201 | B2 | 3/2014 |

* cited by examiner

*Primary Examiner* — Carla J Therrien
(74) *Attorney, Agent, or Firm* — Sughrue Mion, PLLC

(57) ABSTRACT

A conductive roller includes a support member, an elastic layer disposed on an outer peripheral surface of the support member, and a surface layer disposed on an outer peripheral surface of the elastic layer. The elastic layer includes a cylindrical elastic foam and a conductive covering layer covering an exposed surface of the elastic foam, and the elastic layer has a hysteresis loss of 44% or less.

20 Claims, 6 Drawing Sheets

CONDUCTIVE ROLLER, TRANSFER DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-086217 filed May 26, 2022.

BACKGROUND

(i) Technical Field

The present disclosure relates to conductive rollers, transfer devices, process cartridges, and image forming apparatuses.

(ii) Related Art

Japanese Unexamined Patent Application Publication No. 2010-139832 discloses a semiconductive member including a surface layer containing an alkali metal salt represented by general formula (1) below:

$$(M)_n \cdot X \quad (1)$$

where:

- n is equal to the valence of the anion X,
- M represents $Na^+$, $K^+$, or $Li^+$,
- X represents $Cl^-$, $Br^-$, $I^-$, $F^-$, $CH_3COO^-$, $CF_3COO^-$, $CH(COOH)\ CHCOO^-$, $(CHCOO^-)_2$, $CH_2\ (COOH)\ CH_2COO^-$, $(CH_2COO^-)_2$, $(HOOC)Ar(COO^-)$, $Ar(COO^-)_2$, $(HOOC)_2Ar(COO^-)$, $(HOOC)Ar\ (COO^-)_2$, $Ar(COO^-)_3$, $(HOOC)_3Ar(COO^-)$, $(HOOC)_2\ Ar(COO^-)_2$, $(HOOC)Ar(COO^-)_3$, $Ar(COO^-)_4$, $Ar—SO_3^-$, $Ar(SO_3^-)_2$, an oligomer or polymer having an acrylate anion unit, or an oligomer or polymer having a methacrylate anion unit, and
- Ar represents a benzene ring, a naphthalene ring, or a biphenyl ring.

SUMMARY

Aspects of non-limiting embodiments of the present disclosure relate to a conductive roller with superior anti-soiling properties for the back side of a printed material to be obtained as compared to a conductive roller which comprises a support member, an elastic layer disposed on an outer peripheral surface of the support member, and a surface layer disposed on an outer peripheral surface of the elastic layer, in which the elastic layer includes a cylindrical elastic foam and a conductive covering layer covering an exposed surface of the elastic foam, and in which the elastic layer has a hysteresis loss of less than 44%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a conductive roller comprising a support member, an elastic layer disposed on an outer peripheral surface of the support member, and a surface layer disposed on an outer peripheral surface of the elastic layer, wherein the elastic layer includes a cylindrical elastic foam and a conductive covering layer covering an exposed surface of the elastic foam, and the elastic layer has a hysteresis loss of 44% or less.

BRIEF DESCRIPTION OF THE DRAWINGS

An exemplary embodiment of the present disclosure will be described in detail based on the following figures, wherein.

DETAILED DESCRIPTION

Figure 1A:
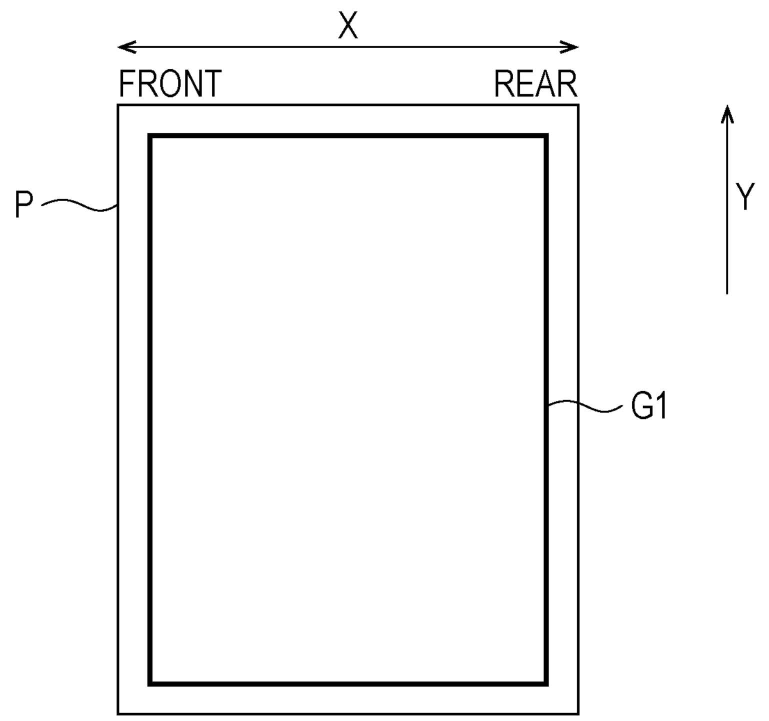
FIGS. 1A and 1B are schematic views for illustrating the parallelism of an image transferred to a recording medium.

An exemplary embodiment of the present disclosure will be described below. The following description and examples are intended to illustrate the exemplary embodiment and not to limit the scope of the exemplary embodiment.

In the present disclosure, a numerical range expressed using "to" refers to a range including the values recited before and after "to" as the minimum and maximum values, respectively.

For numerical ranges recited stepwise in the present disclosure, the upper or lower limit of one numerical range may be replaced by the upper or lower limit of another numerical range recited stepwise. In addition, the upper or lower limit of a numerical range recited in the present disclosure may be replaced by a value given in the examples.

In the present disclosure, the term "step" includes not only independent steps, but also steps that cannot be clearly distinguished from other steps as long as the intended purposes of those steps are achieved.

When an exemplary embodiment is described with reference to the drawings in the present disclosure, the configuration of the exemplary embodiment is not limited to the configuration illustrated in the drawings. In addition, the sizes of the members in the drawings are conceptual, and the relative size relationship between the members is not limited thereto.

In the present disclosure, each component may include a plurality of materials of that category. When the amount of each component in a composition is mentioned in the present disclosure, it refers to the total amount of materials of that category present in the composition unless otherwise specified if there are a plurality of materials of that category in the composition.

Conductive Roller

A conductive roller according to the present exemplary embodiment comprises a support member, an elastic layer disposed on an outer peripheral surface of the support member, and a surface layer disposed on an outer peripheral surface of the elastic layer, the elastic layer includes a cylindrical elastic foam and a conductive covering layer covering an exposed surface of the elastic foam, and the elastic layer has a hysteresis loss of 44% or less.

Conductive rollers in the related art may have insufficient cleaning performance, and when the conductive rollers are used as, for example, transfer members, the back sides of printed materials may be soiled with toner and other substances deposited on the conductive rollers.

The elastic layer of the conductive roller according to the present exemplary embodiment includes a cylindrical elastic foam and a conductive covering layer covering an exposed surface of the elastic foam, and the elastic layer has a hysteresis loss of 44% or less; therefore, the contact of the conductive roller with a cleaning member may be improved, so that the cleaning member may exhibit sufficient cleaning performance and leave little or no deposits on the conductive roller, thus providing superior anti-soiling properties for the back side of a printed material to be obtained.

In addition, because the elastic layer of the conductive roller according to the present exemplary embodiment has a hysteresis loss of 44% or less, the depth of pressing of the conductive roller against a counter roller may be easily adjusted, and therefore, the parallelism of an image to be obtained may be easily increased, as described later.

When a passage area through which a recording medium passes is formed by pressing the outer peripheral surface of a conductive roller against a counter roller, and an image is transferred to a recording medium in the passage area, the parallelism of the image transferred to the recording medium may be decreased.

Figure 1B:
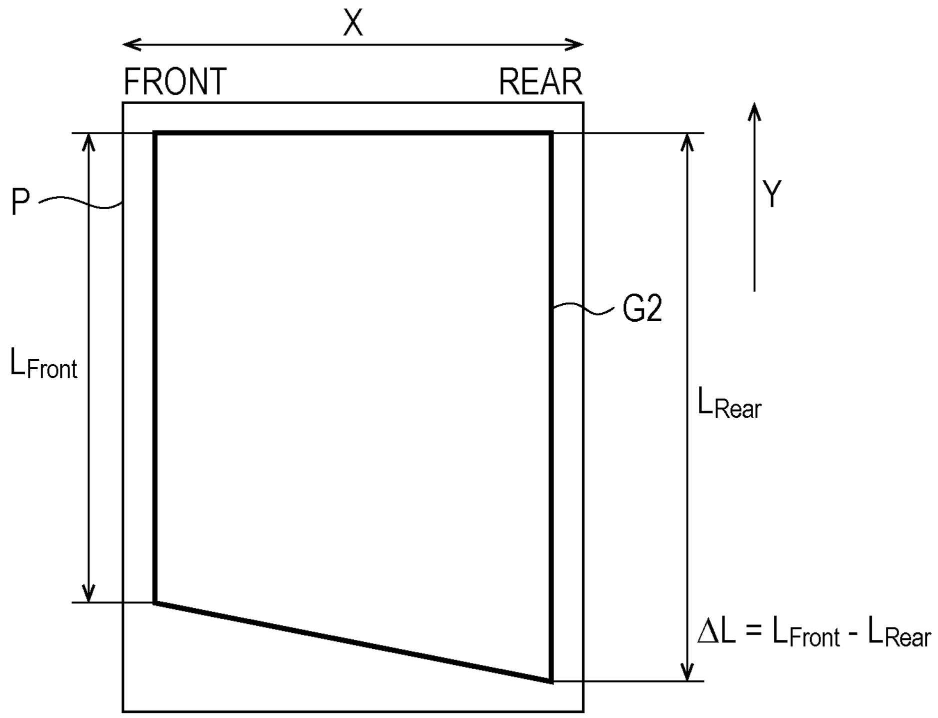

Here, the parallelism of a transferred image refers to the degree of parallelism of the image with respect to the direction (the direction of the arrow X in FIGS. 1A and 1B) orthogonal to the transport direction (the direction of the arrow Y in FIGS. 1A and 1B) of a recording medium P in the passage area. Specifically, for example, as illustrated in FIG. 1A, when a rectangular image G1 defined by sides parallel to the respective sides of the recording medium P is to be formed on the recording medium P, as illustrated in FIG. 1B, the parallelism of the transferred image is defined as the difference ΔL (=$L_{Front}$−$L_{Rear}$) between the line image length $L_{Front}$ at one end (denoted as "FRONT" in FIGS. 1A and 1B) and the line image length $L_{Rear}$ at the other end (denoted as "REAR" in FIGS. 1A and 1B) in the direction of the arrow X of an actual image G2 transferred to the recording medium P.

An example of a method of correction for ΔL above is to adjust the depth of pressing of the conductive roller against a counter roller at both ends of the conductive roller in the axial direction so that the amount of transport of the recording medium differs in the direction orthogonal to the transport direction of the recording medium.

The conductive roller according to the present exemplary embodiment is not limited to any particular use.

For example, the conductive roller according to the present exemplary embodiment may be used as a transfer roller in an electrophotographic image forming apparatus. The conductive roller according to the present exemplary embodiment is not limited to the use mentioned above, but may also be used as, for example, a charging roller, a developing roller, or a paper feed roller.

Hysteresis Loss of Elastic Layer

The conductive roller according to the exemplary embodiment includes an elastic layer disposed on an outer peripheral surface of a support member, the elastic layer includes a cylindrical elastic foam and a conductive covering layer covering an exposed surface of the elastic foam, and the elastic layer has a hysteresis loss of 44% or less.

"Hysteresis loss" in the present exemplary embodiment refers to an energy loss that occurs when a strain is induced in the elastic layer by applying a particular load to the elastic layer for a particular period of time and that is not recovered after a particular period of time elapses from the removal of the load.

From the viewpoint of the anti-soiling properties for the back side of a printed material to be obtained (hereinafter also simply referred to as "back-side anti-soiling properties") and the ease of increasing the parallelism of an image to be obtained (hereinafter also referred to as "ease of parallelism adjustment"), the elastic layer preferably has a hysteresis loss of 40% or less, more preferably 1% or more and 35% or less, particularly preferably 1% or more and 30% or less.

The hysteresis loss of the elastic layer according to the present exemplary embodiment is calculated by Method E of JIS K 6400-2(2012). However, a conductive roller including an elastic layer disposed on an outer peripheral surface of a support member is used as a sample for measurement.

Although the method for adjusting the hysteresis loss of the elastic layer within the above range is not particularly limited, a method in which, for example, the conductive particle content of the elastic foam, the density of the elastic foam, or the number of cells in the elastic foam is adjusted may be used.

Conductive Particle Content of Elastic Foam

The elastic foam may or may not contain conductive particles.

From the viewpoint of back-side anti-soiling properties and ease of parallelism adjustment, the elastic foam preferably has a conductive particle content of 1% by mass or less, more preferably 0.5% by mass or less, even more preferably 0.1% by mass or less, particularly preferably 0% by mass, based on the total mass of the elastic foam.

The lower limit of the conductive particle content is 0% by mass, which means that the elastic foam contains no conductive particles.

The details of the elastic foam and the conductive particles are described later.

Density of Elastic Foam

From the viewpoint of back-side anti-soiling properties and ease of parallelism adjustment, the elastic foam preferably has a density of 80 kg/$m^3$ or less, more preferably 30 kg/$m^3$ or more and 75 kg/$m^3$ or less, particularly preferably 35 kg/$m^3$ or more and 70 kg/$m^3$ or less.

Number of Cells in Elastic Foam

From the viewpoint of back-side anti-soiling properties and ease of parallelism adjustment, the number of cells in the elastic foam is preferably 20 cells/25 mm or more and 80 cells/25 mm or less, more preferably 30 cells/25 mm or more and 75 cells/25 mm or less, particularly preferably 40 cells/25 mm or more and 65 cells/25 mm or less.

Here, the cell size, density, and percentage of closed cells, described later, of the elastic foam are determined as follows.

First, cross-sections of the elastic layer (i.e., the elastic foam in the elastic layer) in the thickness direction are prepared using a razor. A total of four cross-sections are prepared by cutting the elastic layer parallel to the axial direction of the conductive roller at intervals of 90° in the circumferential direction.

An image of the center of each cross-section in the axial direction is captured under a laser microscope (Keyence Corporation, VK-X200). The image is analyzed with image analysis software (Media Cybernetics, Inc., Image-Pro Plus) to measure the maximum sizes and areas of cells.

If the elastic foam has an open-cell structure, it is estimated how cells connect (link) to each other from the shape of the open cells, the individual connecting (linking) cells are virtually separated from each other, and the maximum sizes of the separated cells are determined. Specifically, for example, if the open cells are estimated to have a shape in which five cells connect (link) to each other, the five cells are virtually separated into five, and the maximum sizes of the five separated cells are measured.

The cell size is determined by calculating the arithmetic mean of the maximum sizes of 100 cells randomly selected from each cross-sectional image analyzed and, based on the resulting values, calculating the arithmetic mean for the four cross-sections.

The percentage of closed cells can be determined as (total area of closed cells in cross-sectional image analyzed)/(total area of cells in cross-sectional image analyzed)×100.

Here, closed cells are defined as cells that are completely enclosed by wall surfaces in cross-sectional images.

The density is measured as follows.

The elastic layer (i.e., the elastic foam in the elastic layer) is cut with a razor to prepare a cube. The preparation of as large a foam as possible may allow for accurate measurement. Next, the length, width, and height of the cube are measured, the volume is calculated, the mass is measured, and the density is determined as mass/volume.

The conductive roller according to the present exemplary embodiment will be described with reference to the drawings.

Figure 2:
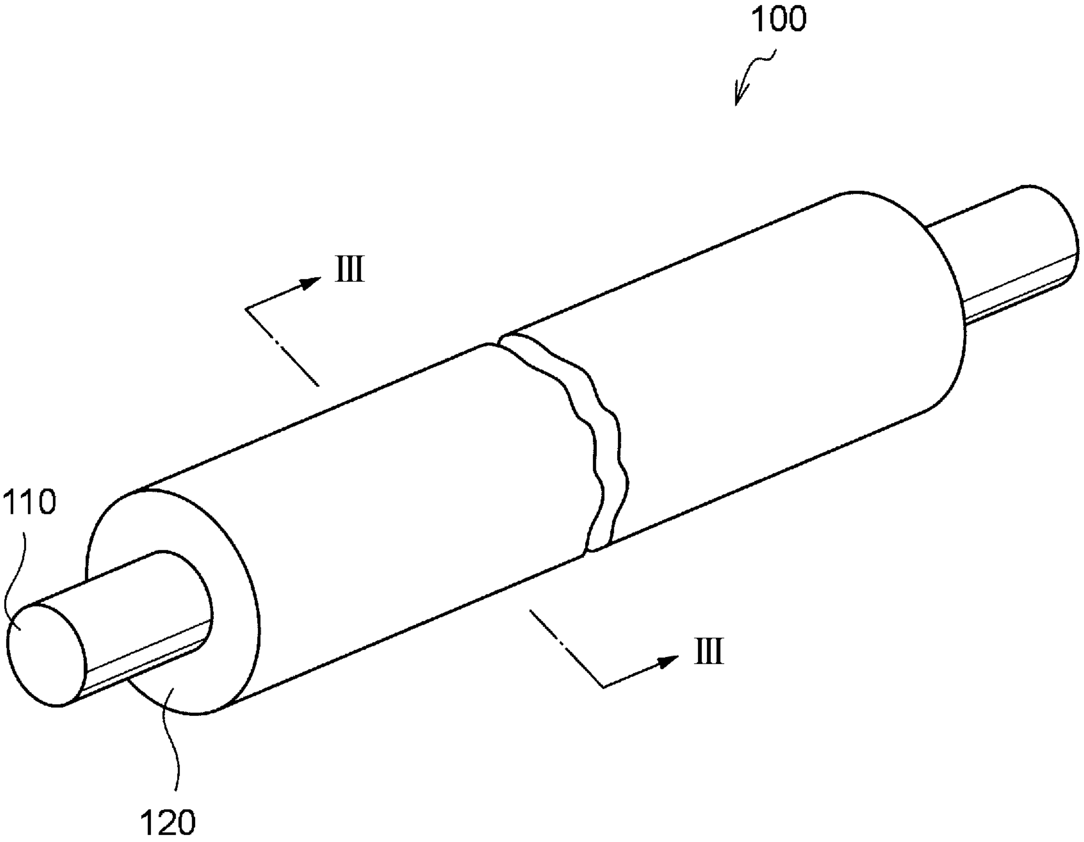
FIG. 2 is a schematic perspective view illustrating an example conductive roller according to the present exemplary embodiment.
Figure 3:
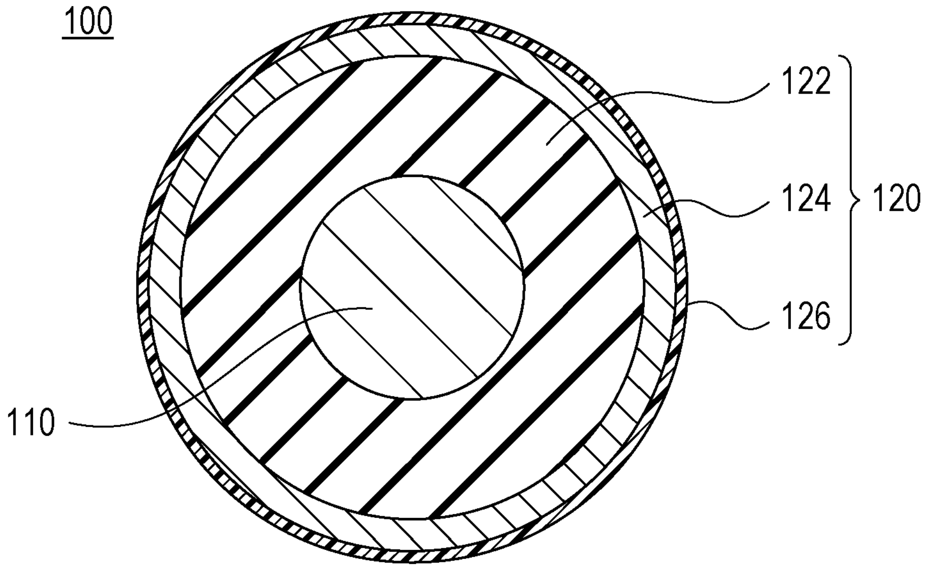
FIG. 3 is a schematic sectional view illustrating the example conductive roller according to the present exemplary embodiment and is a sectional view taken along line III-III in FIG. 2.

FIG. 2 is a schematic perspective view illustrating an example conductive roller according to the present exemplary embodiment. FIG. 3 is a sectional view taken along line III-III in FIG. 2 and is a sectional view taken in the radial direction of the conductive roller illustrated in FIG. 2.

As illustrated in FIG. 2, a conductive roller 100 is a roller member including a cylindrical support member 110 and a layered member 120 including an elastic layer and a surface layer stacked on an outer peripheral surface of the support member 110. As illustrated in FIG. 3, the layer structure of the conductive roller 100 includes an elastic layer 122 disposed on the outer peripheral surface of the cylindrical support member 110, an intermediate layer 124 disposed on an outer peripheral surface of the elastic layer 122, and a surface layer 126 disposed on an outer peripheral surface of the intermediate layer 124. The intermediate layer 124 and the surface layer 126 form the surface layer of the conductive roller according to the present exemplary embodiment.

The conductive roller according to the present exemplary embodiment is not limited to the configuration illustrated in FIGS. 2 and 3; for example, the conductive roller according to the present exemplary embodiment may include an adhesive layer between the support member 110 and the elastic layer 122, between the elastic layer 122 and the intermediate layer 124, or between the intermediate layer 124 and the surface layer 126 where appropriate.

The materials and other details of the individual layers forming the conductive roller according to the present exemplary embodiment will be described below.

Support Member

The support member of the conductive roller according to the present exemplary embodiment may be any member that functions as a support member for the conductive roller.

The support member may be a hollow member (i.e., a hollow cylindrical member) or a solid member (i.e., a solid cylindrical member).

The support member may be a conductive support member when an electric field is formed between the conductive roller and a counter roller.

Examples of conductive support members include metal members such as those formed of iron (e.g., free-cutting steel), copper, brass, stainless steel, aluminum, and nickel; resin or ceramic members having the outer surfaces thereof subjected to plating treatment; and resin or ceramic members containing conductors.

The outer diameter of the support member may be determined depending on the use of the conductive roller.

For example, if the conductive roller according to the present exemplary embodiment is a second transfer roller, the support member may have an outer diameter of, for example, 3 mm or more and 30 mm or less.

Elastic Layer

The conductive roller according to the present exemplary embodiment includes an elastic layer disposed on an outer peripheral surface of the support member, the elastic layer includes a cylindrical elastic foam and a conductive covering layer covering an exposed surface of the elastic foam, and the elastic layer has a hysteresis loss of 44% or less.

Elastic Foam

The elastic foam forming the elastic layer is a foam containing an elastic material (also referred to as "rubber material").

Examples of elastic materials include isoprene rubber, chloroprene rubber, epichlorohydrin rubber, butyl rubber, polyurethane, silicone rubber, fluorocarbon rubber, styrene-butadiene rubber, butadiene rubber, nitrile rubber, ethylene-propylene rubber, epichlorohydrin-ethylene oxide copolymer rubber, epichlorohydrin-ethylene oxide-allyl glycidyl ether terpolymer rubber, ethylene-propylene-diene terpolymer rubber (EPDM), acrylonitrile-butadiene copolymer rubber (NBR), natural rubber, and mixtures thereof.

Of these, it is preferred to use polyurethane, more preferably polyether polyurethane or polyester polyurethane, particularly preferably polyether polyurethane, from the viewpoint of back-side anti-soiling properties and ease of parallelism adjustment.

Examples of blowing agents for obtaining the elastic foam include water; azo compounds such as azodicarbonamide, azobisisobutyronitrile, and diazoaminobenzene; benzenesulfonyl hydrazides such as benzenesulfonyl hydrazide, 4,4'-oxybisbenzenesulfonyl hydrazide, and toluenesulfonyl hydrazide; bicarbonate salts such as sodium hydrogen carbonate, which generate carbon dioxide gas by thermal decomposition; mixtures of $NaNO_2$ and $NH_4Cl$, which generate nitrogen gas; and peroxides, which generate oxygen.

To obtain the elastic foam, other additives such as blowing aids, foam stabilizers, and catalysts may optionally be used.

Examples of conductive particles that may be present in the elastic foam include electronic conductors.

Examples of electronic conductors include powders of the following materials: carbon black such as ketjen black and acetylene black; pyrolytic carbon; graphite; metals and alloys such as aluminum, copper, nickel, and stainless steel; conductive metal oxides such as tin oxide, indium oxide, titanium oxide, tin oxide-antimony oxide solid solutions, and tin oxide-indium oxide solid solutions; and insulating materials having the surfaces thereof subjected to conductive treatment.

Within the content range described above, a single electronic conductor may be used alone, or two or more electronic conductors may be used in combination.

Examples of other additives include known materials that can be added to elastomers, such as ionic conductors, softeners, plasticizers, curing agents, vulcanizing agents, vulcanization accelerators, antioxidants, surfactants, coupling agents, and fillers (e.g., silica and calcium carbonate).

If the elastic foam contains particles such as conductive particles or fillers as mentioned above, the elastic layer exhibits increased hardness and thus tends to be less effective in improving the parallelism of an image transferred to a recording medium. Accordingly, the elastic foam may contain a smaller amount of particles. If the elastic foam contains particles, the elastic foam may have a total particle content of 1% by mass or less based on the total mass of the elastic foam.

The cell structure of the elastic foam may be an open-cell structure from the viewpoint of suitability for formation of the conductive covering layer and the ease of increasing the parallelism of an image transferred to a recording medium.

Here, "open-cell structure" refers to a structure in which neighboring cells connect to each other, with some of the connecting cells being exposed (open) on the surface.

In addition, the elastic foam may have a lower percentage of closed cells. For example, the percentage of closed cells is preferably 50% or less (more preferably 30% or less).

Formation of Elastic Foam

The method for forming the cylindrical elastic foam is not particularly limited, and known methods may be used.

Examples of methods for forming the cylindrical elastic foam include a method in which a composition containing an elastic material, a blowing agent, and optionally other ingredients (e.g., a vulcanizing agent) is prepared, is formed into a hollow cylindrical shape by extrusion molding, and is vulcanized and foamed by heating; and a method in which a large foam is cut into a hollow cylindrical shape.

The cylindrical elastic foam may also be obtained by forming a solid cylindrical elastic foam and then forming a central hole for insertion of the support member.

The thus-obtained cylindrical elastic foam may optionally be further subjected to post-processing such as shape trimming and surface polishing.

Conductive Covering Layer

The conductive covering layer forming the elastic layer is a conductive layer covering the exposed surface of the elastic foam (i.e., the surface of the elastic foam in contact with air, including, for example, the outer peripheral surface and cell wall surfaces of the cylindrical elastic foam).

The exposed surface of the elastic foam may be partially or completely covered by the conductive covering layer.

The conductive covering layer is formed from a treatment liquid containing a conductor and a resin.

Here, the conductor used in the treatment liquid may be, for example, an electronic conductor or an ionic conductor, preferably an electronic conductor.

The treatment liquid may contain one or more conductors.

Here, examples of electronic conductors are similar to those that may be present in the elastic foam.

The resin used in the treatment liquid is not particularly limited as long as the resin can form a covering layer on the exposed surface of the elastic foam, and examples of such resins include acrylic resins, urethane resins, fluorocarbon resins, and silicone resins. These resins may be used as a latex.

Examples of latexes include latexes of the resins mentioned above, natural rubber latex, butadiene rubber latex, acrylonitrile-butadiene rubber latex, acrylic rubber latex, polyurethane rubber latex, fluorocarbon rubber latex, and silicone rubber latex.

The treatment liquid may contain a conductor, a resin, and water; that is, the treatment liquid may be an aqueous dispersion containing a conductor and a resin.

The concentrations of the conductor and the resin in the treatment liquid may be determined depending on, for example, suitability for formation of the conductive covering layer and the target resistance value of the elastic layer.

Formation of Conductive Covering Layer

The conductive covering layer is formed by applying the treatment liquid to the elastic foam and drying the coating by heating.

Examples of methods for applying the treatment liquid to the elastic foam include a method in which the treatment liquid is applied to the elastic foam by a technique such as spraying and a method in which the elastic foam is immersed in the treatment liquid.

By such methods, the elastic foam is impregnated with the treatment liquid from the surface thereof to the interior of the cells. The deposited treatment liquid is then dried by a technique such as heating to form the conductive covering layer.

As the conductive covering layer, for example, a covering layer and a method for formation thereof such as those described in Japanese Unexamined Patent Application Publication No. 2009-244824 may be used.

As described above, the conductive covering layer is formed on the exposed surface of the elastic foam to form the elastic layer of the conductive roller according to the present exemplary embodiment.

Volume Resistance Value of Elastic Layer

The elastic layer of the conductive roller according to the present exemplary embodiment has a volume resistance value of $10^5$Ω or less, preferably 1Ω or more and 104Ω or less, more preferably 10Ω or more and 103Ω or less, at an applied voltage of 10 V.

Here, the volume resistance value of the elastic layer is measured as follows.

A roller member having an elastic layer for measurement around the outer periphery of a conductive support member is first prepared, and the resulting roller member is used to measure the volume resistance value of the elastic layer. If the conductive roller according to the present exemplary embodiment includes a conductive support member, a roller member obtained by removing the surface layer from the conductive roller may be used for measurement.

The roller member is placed on a metal plate such as a copper plate, with a load of 500 g applied to each end of the roller member, a voltage (V) of 10 V is applied between the conductive support member of the roller member and the metal plate with a microammeter (R8320 manufactured by Advantest Corporation), the current I (A) is read after five seconds, and the volume resistance value is determined by calculation using the following equation:

$$\text{Equation: volume resistance value } Rv\ (\Omega)=V/I$$

The measurement is performed in an environment at a temperature of 22° C. and a humidity of 55% RH.

Young's Modulus of Elastic Layer

The elastic layer of the conductive roller according to the present exemplary embodiment may be soft from the viewpoint of the ease of increasing the parallelism of an image transferred to a recording medium.

Specifically, the elastic layer preferably has a Young's modulus of 150 kPa or less, more preferably 35 kPa or more and 150 kPa or less.

Here, the Young's modulus of the elastic layer is measured as follows.

The method for measuring the Young's modulus of each layer basically conforms to ISO 527.

For the intermediate layer and the elastic layer, a dumbbell-shaped tensile test specimen with a gauge length of 50 mm and a thickness of 5 mm is prepared and used to obtain a stress ($\sigma$)-strain ($\varepsilon$) curve at a tensile speed of 5 mm/min with a tabletop precision universal tester (AGS-X; manufactured by Shimadzu Corporation), the stress at a strain of 0.05% to 0.25% is measured, and the Young's modulus is determined as $\Delta\sigma/\Delta\varepsilon$.

The Young's modulus of the surface layer is determined in the same manner as those of the intermediate layer and the elastic layer except that a dumbbell-shaped tensile test specimen with a thickness of 0.2 mm is prepared and used.

Thickness of Elastic Layer

The thickness of the elastic layer of the conductive roller according to the present exemplary embodiment may be determined depending on the use of the conductive roller.

For example, if the conductive roller according to the present exemplary embodiment is a second transfer roller, the elastic layer may have a thickness of, for example, 1 mm or more and 10 mm or less.

The elastic layer of the conductive roller according to the present exemplary embodiment may be thicker from the viewpoint of the ease of increasing the parallelism of an image transferred to a recording medium; specifically, the ratio (Y/X) of the thickness Y of the elastic layer to the total thickness X of the elastic layer and the surface layer is preferably 0.66 or more and 0.95 or less, more preferably 0.75 or more and 0.92 or less.

Surface Layer

The conductive roller according to the present exemplary embodiment includes a surface layer disposed on the outer peripheral surface of the elastic layer.

The surface layer is a layer forming the outermost surface of the conductive roller and includes one or more layers.

In particular, the surface layer of the conductive roller according to the present exemplary embodiment may include an intermediate layer disposed on the outer peripheral surface of the elastic layer and a surface layer disposed on an outer peripheral surface of the intermediate layer.

Intermediate Layer

The intermediate layer is a layer disposed on the outer peripheral surface of the elastic layer.

The intermediate layer is a layer that contributes to resistance adjustment of the conductive roller, and the intermediate layer disposed on the outer peripheral surface of the elastic layer preferably has a volume resistance value of 104Ω or more and $10^{10}\Omega$ or less (more preferably, $10^{6}\Omega$ or more and 109Ω or less) at an applied voltage of 100 V.

The volume resistance value of the intermediate layer is measured in the same manner as that of the elastic layer.

The intermediate layer may contain a conductor to achieve the volume resistance value described above.

Although the conductor used may be an electronic conductor or an ionic conductor, an ionic conductor may be used from the viewpoint of enhanced charge retention.

That is, the intermediate layer may contain an ionic conductor.

A single ionic conductor may be used alone, or two or more ionic conductors may be used in combination.

Here, examples of ionic conductors that may be present in the intermediate layer include quaternary ammonium salts (e.g., perchlorate salts, chlorate salts, fluoroborate salts, sulfate salts, ethosulfate salts, benzyl bromide salts, and benzyl chloride salts of lauryltrimethylammonium, stearyltrimethylammonium, octadodecyltrimethylammonium, hexadecyltrimethylammonium, and modified fatty acid-dimethylethylammonium), aliphatic sulfonic acid salts, higher alcohol sulfate ester salts, higher alcohol ethylene oxide adduct sulfate ester salts, higher alcohol phosphate ester salts, higher alcohol ethylene oxide adduct phosphate ester salts, betaine, higher alcohol ethylene oxide adducts, polyethylene glycol fatty acid esters, and polyhydric alcohol fatty acid esters.

The ionic conductor may also be a polymer material with ionic conductivity, such as epichlorohydrin rubber, epichlorohydrin-ethylene oxide copolymer rubber, or epichlorohydrin-ethylene oxide-allyl glycidyl ether terpolymer rubber.

The ionic conductor may also be a compound having an ionic conductor attached to an end of a polymer material such as a resin.

The amount of ionic conductor may fall within a range in which the volume resistance value described above can be achieved.

If the intermediate layer contains a binder material, the amount of ionic conductor is preferably 0.1 parts by mass or more and 5.0 parts by mass or less, more preferably 0.5 parts by mass or more and 3.0 parts by mass or less, based on 100 parts by mass of the binder material.

In addition to the ionic conductor, the intermediate layer may contain a binder material.

The binder material is not particularly limited, and examples of binder materials include resins and elastic materials that can form the intermediate layer. Examples of resins that may be used in the intermediate layer include urethane resins, acrylic resins, epoxy resins, and silicone resins.

The intermediate layer may contain other additives depending on, for example, the target physical properties of the intermediate layer.

Young's Modulus of Intermediate Layer

The intermediate layer preferably has a Young's modulus of 5 MPa or more, more preferably 5 MPa or more and 10 MPa or less.

The Young's modulus of the intermediate layer is measured in the same manner as that of the elastic layer.

Thickness of Intermediate Layer

The thickness of the intermediate layer of the conductive roller according to the present exemplary embodiment may be determined depending on the use of the conductive roller. The intermediate layer may be thinner than the elastic layer from the viewpoint of the ease of increasing the parallelism of an image transferred to a recording medium. Specifically, the thickness of the intermediate layer is preferably $1/20$ or more and $1/2$ or less, more preferably $1/10$ or more and $1/3$ or less, of the thickness of the elastic layer.

For example, if the conductive roller according to the present exemplary embodiment is a second transfer roller, the intermediate layer may have a thickness of, for example, 0.5 mm or more and 5 mm or less.

The method for forming the intermediate layer is not particularly limited, and examples of methods for forming the intermediate layer include a method in which a coating liquid for forming the intermediate layer is applied to the elastic layer and the resulting coating is dried.

Surface Layer

The surface layer is a layer that is disposed on the outer peripheral surface of the intermediate layer and that forms the outermost surface of the conductive roller.

Because the surface layer comes into contact with media, the surface layer may have releasability.

The surface layer may be a layer containing a resin.

Although the resin present in the surface layer is not particularly limited, examples of resins include urethane resins, polyester resins, phenolic resins, acrylic resins, epoxy resins, and cellulose resins.

The surface layer may contain a conductor.

Examples of conductors that may be present in the surface layer include electronic conductors and ionic conductors.

Examples of electronic conductors that may be present in the surface layer are similar to those that may be used in the conductive covering layer. Examples of ionic conductors that may be present in the surface layer are similar to those that may be used in the intermediate layer.

The surface layer may contain other additives depending on, for example, the target physical properties of the surface layer.

Young's Modulus of Surface Layer

The surface layer preferably has a Young's modulus of 10 MPa or more, more preferably 10 MPa or more and 400 MPa or less, even more preferably 50 MPa or more and 400 MPa or less.

The Young's modulus of the surface layer is measured in the same manner as that of the elastic layer. However, a dumbbell-shaped tensile test specimen with a thickness of 0.2 mm is used. This dumbbell-shaped tensile test specimen is obtained by analyzing the composition of the surface layer of the conductive roller for measurement, placing a material, for forming the surface layer, that has a composition identical to the composition determined by the analysis into a resin mold with high releasability, such as one formed of polytetrafluoroethylene (PTFE), curing the material with heat, and then removing the resulting specimen from the mold.

Thickness of Surface Layer

The thickness of the surface layer of the conductive roller according to the present exemplary embodiment may be determined depending on the use of the conductive roller.

For example, if the conductive roller according to the present exemplary embodiment is a second transfer roller, the surface layer may have a thickness of, for example, 0.01 mm or more and 0.05 mm or less.

Volume Resistance Value of Surface Layer

The surface layer preferably has a volume resistance value of 104Ω or more and $10^{14}$Ω or less, more preferably $10^5$Ω or more and $10^{11}$Ω or less, at an applied voltage of 10 V.

The volume resistance value of the surface layer is measured in accordance with JIS K 6911:1995 as follows.

A single-layer sheet member is first prepared from a surface layer material, and the resulting single-layer sheet member is used to measure the volume resistance value. The single-layer sheet member may have a thickness of 0.2 mm. The single-layer sheet member is placed between circular electrodes, a voltage (V) of 10 V is applied between the front and back electrodes with a microammeter (R8320 manufactured by Advantest Corporation), the current I (A) is read after five seconds, and the volume resistance value is determined by calculation using the following equation:

$$\text{Equation: volume resistance value } Rv\ (\Omega)=V/I$$

The measurement is performed in an environment at a temperature of 22° C. and a humidity of 55% RH.

The method for forming the surface layer is not particularly limited, and examples of methods for forming the surface layer include a method in which a coating liquid for forming the surface layer is applied to the intermediate layer and the resulting coating is dried.

Volume Resistance Value of Conductive Roller

The conductive roller according to the present exemplary embodiment preferably has a volume resistance value of 104Ω or more and $10^{12}$Ω or less, more preferably $10^5$Ω or more and $10^{11}$Ω or less, even more preferably $10^6$Ω or more and $10^{10}$Ω or less, at an applied voltage of 1,000 V.

The volume resistance value of the conductive roller is measured in the same manner as that of the elastic layer.

Image Forming Apparatus, Transfer Device, and Process Cartridge

A transfer device according to the present exemplary embodiment is a transfer device comprising a transfer roller comprising the conductive roller according to the present exemplary embodiment and may be a transfer device comprising a transfer roller comprising the conductive roller according to the present exemplary embodiment and a cleaning member in contact with the transfer roller.

The cleaning member is preferably a plate-shaped cleaning member, more preferably a cleaning blade.

A process cartridge according to the present exemplary embodiment process is a process cartridge comprising the conductive roller according to the present exemplary embodiment and may be a process cartridge that is attachable to and detachable from an image forming apparatus and that comprises an image carrier, a charging device that charges the image carrier, and the transfer device according to the present exemplary embodiment.

An image forming apparatus according to the present exemplary embodiment is an image forming apparatus comprising the conductive roller according to the present exemplary embodiment and may be an image forming apparatus comprising an image carrier, a charging device that charges the image carrier, a latent image forming device that forms a latent image on a charged surface of the image carrier, a developing device that develops the latent image formed on the surface of the image carrier with a toner to form a toner image, and the transfer device according to the present exemplary embodiment, which transfers the toner image formed on the surface of the image carrier to a recording medium.

Figure 4:
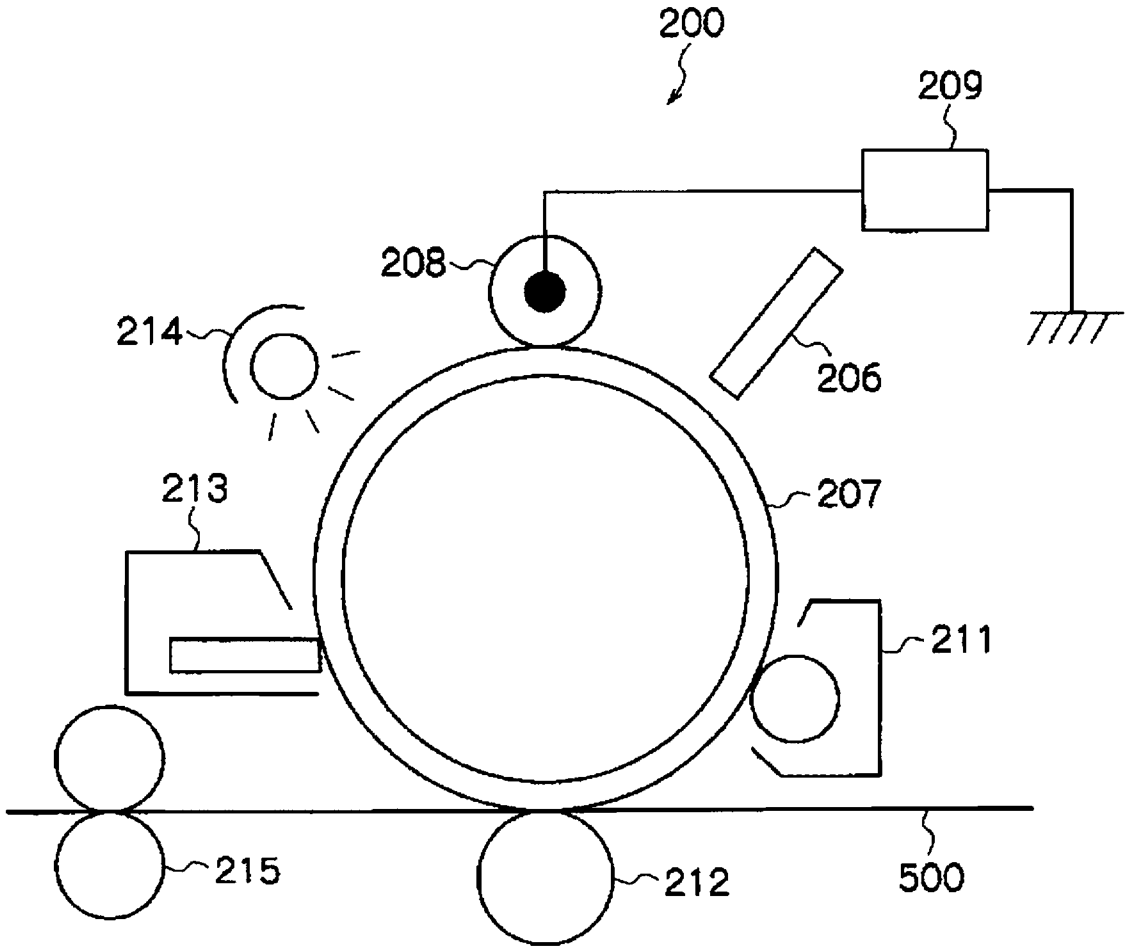
FIG. 4 is a schematic diagram illustrating an example image forming apparatus according to the present exemplary embodiment.

FIG. 4 is a schematic diagram illustrating a direct-transfer image forming apparatus serving as an example image forming apparatus according to the present exemplary embodiment.

An image forming apparatus 200 illustrated in FIG. 4 includes a photoreceptor 207 (an example of an image carrier), a charging roller 208 (an example of a charging section) that charges a surface of the photoreceptor 207, an exposure device 206 (an example of an electrostatic image forming section) that forms an electrostatic image on the charged surface of the photoreceptor 207, a developing device 211 (an example of a developing section) that develops the electrostatic image formed on the surface of the photoreceptor 207 with a developer containing a toner to form a toner image, and a transfer roller 212 (an example of a transfer section, an example of a transfer device according to the present exemplary embodiment) that transfers the toner image formed on the surface of the photoreceptor 207 to a surface of a recording medium.

Here, the conductive roller according to the present exemplary embodiment is used as the transfer roller 212 to form a passage area through which a sheet of recording paper 500 passes by pressing the outer peripheral surface of the transfer roller 212 against the photoreceptor 207, which corresponds to a counter roller.

Figure 6:
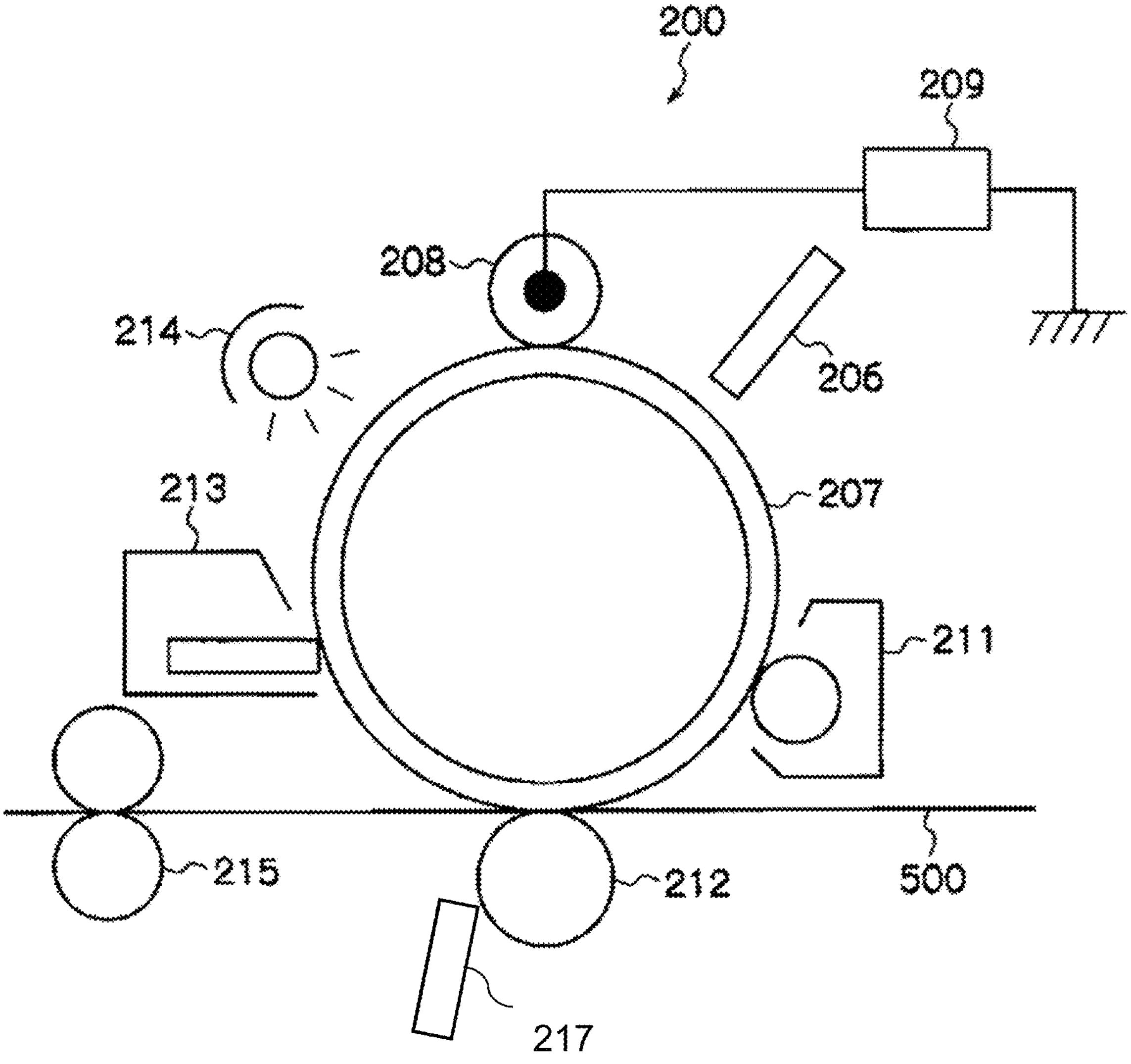
FIG. 6 is a non-limiting schematic diagram illustrating an example image forming apparatus similar to the image forming apparatus of FIG. 4 that includes a cleaning device contacting the transfer roller.

The image forming apparatus 200 illustrated in FIG. 4 further includes a cleaning device 213 that removes residual toner from the surface of the photoreceptor 207, an erase device 214 that erases charge from the surface of the photoreceptor 207, and a fixing device 215 (an example of a fixing section) that fixes a toner image to a recording medium. As shown in FIG. 6, the image forming apparatus may further include a cleaning device 217 in contact with the transfer roller.

The charging roller 208 may be a contact charging roller or a noncontact charging roller. A power supply 209 applies a voltage to the charging roller 208.

The exposure device 206 may be an optical device including a light source such as a semiconductor laser or a light emitting diode (LED).

The developing device 211 is a device that supplies toner to the photoreceptor 207. For example, the developing device 211 includes a developer carrying roller in contact with or in proximity to the photoreceptor 207 and deposits toner on an electrostatic image on the photoreceptor 207 to form a toner image.

The transfer roller 212 is a transfer roller that comes into direct contact with a surface of a recording medium and is disposed at a position opposite the photoreceptor 207. A sheet of recording paper 500 (an example of a recording medium) is fed into a gap where the transfer roller 212 is in contact with the photoreceptor 207 via a feed mechanism. When a transfer bias is applied to the transfer roller 212, an electrostatic force directed from the photoreceptor 207 toward the recording paper 500 acts on the toner image, thereby transferring the toner image from the photoreceptor 207 to the recording paper 500.

The fixing device 215 may be, for example, a heat fixing device including a heating roller and a pressing roller pressed against the heating roller.

The cleaning device 213 may be a device including a cleaning member such as a blade, a brush, or a roller.

The erase device 214 is, for example, a device that irradiates the surface of the photoreceptor 207 with light after transfer to erase residual potential from the photoreceptor 207.

For example, the photoreceptor 207 and the transfer roller 212 may be held together within one housing to form a cartridge structure (process cartridge according to the present exemplary embodiment) attachable to and detachable from an image forming apparatus. The cartridge structure (process cartridge according to the present exemplary embodiment) may further include at least one selected from the group consisting of the charging roller 208, the exposure device 206, the developing device 211, and the cleaning device 213.

The image forming apparatus may be a tandem image forming apparatus in which a plurality of image forming units are mounted side-by-side, each including the photoreceptor 207, the charging roller 208, the exposure device 206, the developing device 211, the transfer roller 212, and the cleaning device 213.

Figure 5:
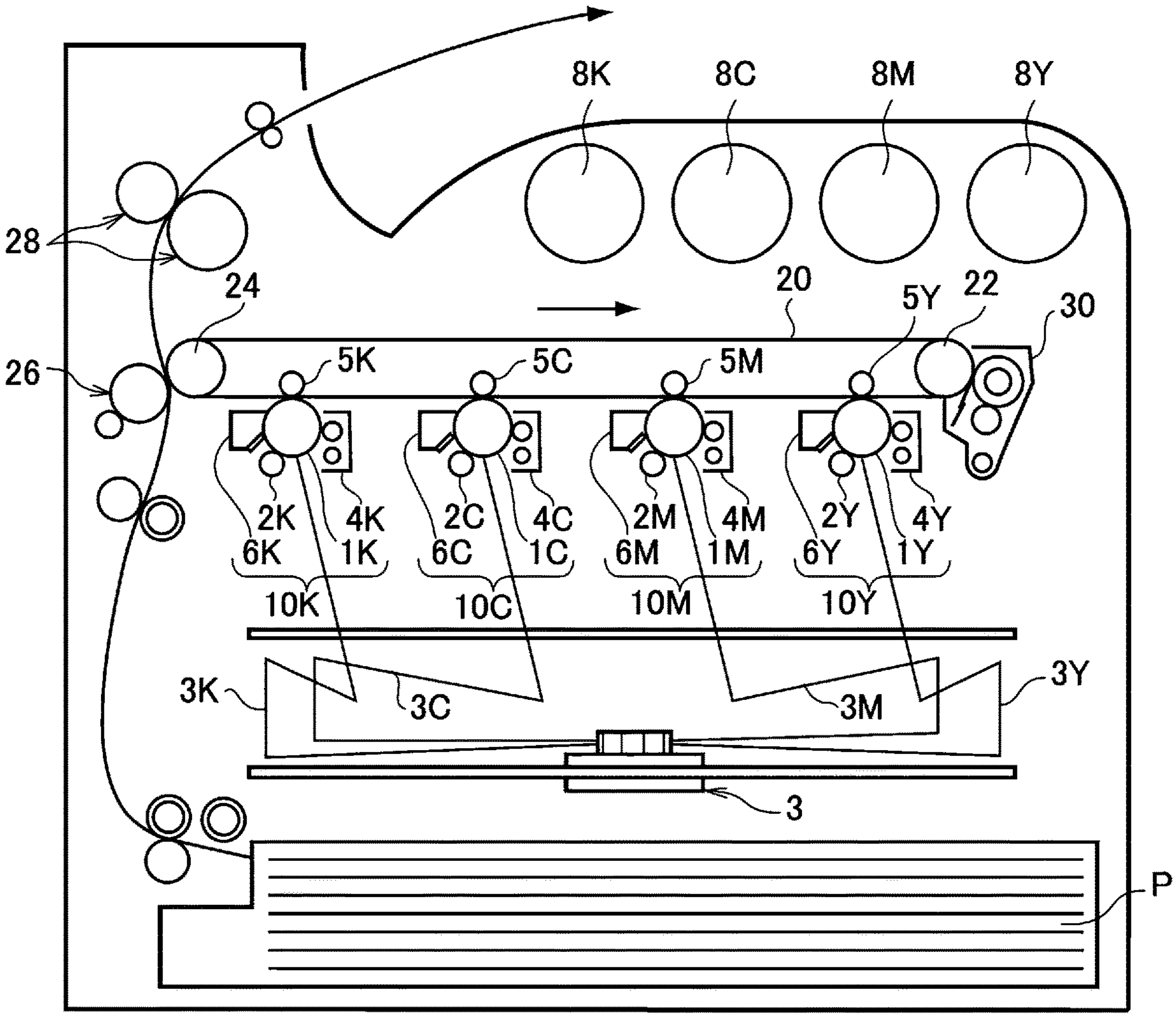
FIG. 5 is a schematic diagram illustrating another example image forming apparatus according to the present exemplary embodiment.

FIG. 5 is a schematic diagram illustrating an intermediate-transfer image forming apparatus serving as an example image forming apparatus according to the present exemplary embodiment. The image forming apparatus illustrated in FIG. 5 is a tandem image forming apparatus in which four image forming units are arranged side-by-side.

In the image forming apparatus illustrated in FIG. 5, a transfer section that transfers a toner image formed on a surface of an image carrier to a surface of a recording medium is configured as a transfer unit (an example of a transfer device according to the present exemplary embodiment) including an intermediate transfer body, a first transfer section, and a second transfer section. The transfer unit may be a cartridge structure attachable to and detachable from an image forming apparatus.

The image forming apparatus illustrated in FIG. 5 includes photoreceptors 1 (an example of an image carrier), charging rollers 2 (an example of a charging section) that charge surfaces of the photoreceptors 1, an exposure device 3 (an example of an electrostatic image forming section) that forms electrostatic images on the charged surfaces of the photoreceptors 1, developing devices 4 (an example of a developing section) that develop the electrostatic images formed on the surfaces of the photoreceptors 1 with developers containing toners to form toner images, an intermediate transfer belt 20 (an example of an intermediate transfer body), first transfer rollers 5 (an example of a first transfer section) that transfer the toner images formed on the surfaces of the photoreceptors 1 to a surface of the intermediate transfer belt 20, and a second transfer roller 26 (an example of a second transfer section) that transfers the toner images transferred to the surface of the intermediate transfer belt 20 to a surface of a recording medium.

Here, the conductive roller according to the present exemplary embodiment is used as the second transfer roller 26 to form a passage area through which a sheet of recording paper P passes by pressing the outer peripheral surface of the second transfer roller 26 against a support roller 24 corresponding to a counter roller.

The image forming apparatus illustrated in FIG. 5 further includes a fixing device 28 (an example of a fixing section) that fixes a toner image to a recording medium, photoreceptor cleaning devices 6 that remove residual toner from the surfaces of the photoreceptors 1, and an intermediate transfer belt cleaning device 30 that removes residual toner from the surface of the intermediate transfer belt 20.

The image forming apparatus illustrated in FIG. 5 includes first to fourth electrophotographic image forming units 10Y, 10M, 10C, and 10K that produce yellow (Y), magenta (M), cyan (C), and black (K) images, respectively, based on image data subjected to color separation. These image forming units 10Y, 10M, 10C, and 10K are arranged side-by-side at intervals in the horizontal direction. The image forming units 10Y, 10M, 10C, and 10K may each be a process cartridge attachable to and detachable from an image forming apparatus.

The intermediate transfer belt 20 extends over the image forming units 10Y, 10M, 10C, and 10K so as to pass through each image forming unit. The intermediate transfer belt 20 is wound around a drive roller 22 and a support roller 24 in contact with the inner surface of the intermediate transfer belt 20 so as to run in the direction from the first image forming unit 10Y toward the fourth image forming unit 10K. A spring or other member (not illustrated) applies force to the support roller 24 in the direction away from the drive roller 22, thereby applying tension to the intermediate transfer belt 20 wound therearound. The intermediate transfer belt cleaning device 30 is disposed opposite the drive roller 22 on the image carrying side of the intermediate transfer belt 20.

The developing devices 4Y, 4M, 4C, and 4K of the image forming units 10Y, 10M, 10C, and 10K are supplied with yellow, magenta, cyan, and black toners, respectively, contained in toner cartridges 8Y, 8M, 8C, and 8K.

The first to fourth image forming units 10Y, 10M, 10C, and 10K have similar configurations and operations; therefore, the first image forming unit 10Y will be described as a representative example when the image forming units are described below.

The first image forming unit 10Y includes a photoreceptor 1Y, a charging roller 2Y that charges a surface of the photoreceptor 1Y, a developing device 4Y that develops an electrostatic image formed on the surface of the photoreceptor 1Y with a developer containing a toner to form a toner image, a first transfer roller 5Y that transfers the toner image formed on the surface of the photoreceptor 1Y to a surface of the intermediate transfer belt 20, and a photoreceptor cleaning device 6Y that removes residual toner from the surface of the photoreceptor 1Y after the first transfer.

The charging roller 2Y charges the surface of the photoreceptor 1Y. The charging roller 2Y may be a contact charging roller or a noncontact charging roller.

The charged surface of the photoreceptor 1Y is irradiated with a laser beam 3Y from the exposure device 3. In this way, an electrostatic image for a yellow image pattern is formed on the surface of the photoreceptor 1Y.

The developing device 4Y contains, for example, an electrostatic image developer containing at least a yellow toner and a carrier. The yellow toner is triboelectrically charged by stirring inside the developing device 4Y. As the surface of the photoreceptor 1Y passes through the developing device 4Y, the electrostatic image formed on the photoreceptor 1Y is developed to form a toner image.

The first transfer roller 5Y is disposed inside the intermediate transfer belt 20 at a position opposite the photoreceptor 1Y. A bias power supply (not illustrated) for applying a first transfer bias is connected to the first transfer roller 5Y. The first transfer roller 5Y transfers the toner image from the photoreceptor 1Y to the intermediate transfer belt 20 by electrostatic force.

Toner images of the individual colors are sequentially transferred from the first to fourth image forming units 10Y, 10M, 10C, and 10K to the intermediate transfer belt 20 so as to be superimposed on top of each other. The intermediate transfer belt 20 having the four superimposed toner images transferred thereto through the first to fourth image forming units 10Y, 10M, 10C, and 10K reaches the second transfer section including the support roller 24 and the second transfer roller 26.

The second transfer roller 26 is a transfer roller that comes into direct contact with a surface of a recording medium and is disposed outside the intermediate transfer belt 20 at a position opposite the support roller 24. A sheet of recording paper P (an example of a recording medium) is fed into a gap where the second transfer roller 26 is in contact with the intermediate transfer belt 20 via a feed mechanism. When a second transfer bias is applied to the second transfer roller 26, an electrostatic force directed from the intermediate transfer belt 20 toward the recording paper P acts on the toner image, thereby transferring the toner image from the intermediate transfer belt 20 to the recording paper P.

The recording paper P having the toner image transferred thereto is transported into a nip between a pair of rollers of the fixing device 28, where the toner image is fixed to the recording paper P.

The toners and developers used in the image forming apparatuses according to the present exemplary embodiment are not particularly limited, and any known electrophotographic toner or developer may be used.

The recording media used in the image forming apparatuses according to the present exemplary embodiment are not particularly limited, and examples of recording media include sheets of paper for use in electrophotographic copiers and printers; and OHP sheets.

EXAMPLES

Exemplary embodiments of the present disclosure will be described in detail with reference to the following examples, although these examples are not intended to limit exemplary embodiments of the present disclosure in any way.

Example 1

Formation of Elastic Layer

EP70 (manufactured by Inoac Corporation) is used as an elastic foam and is polished and shaped into a cylindrical shape with an outer diameter of 28 mm, an inner diameter of 15 mm, and a length of 350 mm to obtain a cylindrical elastic foam.

As a treatment liquid, a conductive treatment liquid is obtained by mixing an aqueous dispersion containing 36% by mass of carbon black dispersed therein with an acrylic emulsion (the trade name "Nipol LX852", manufactured by Zeon Corporation) in a mass ratio of 1:1. The elastic foam obtained in the above manner is immersed in the conductive treatment liquid at 20° C. for 10 minutes.

The elastic foam having the treatment liquid deposited thereon is then dried by heating in a cure oven set to 100° C. for 60 minutes to remove moisture and crosslink the acrylic resin. The acrylic resin is crosslinked and cured to form a conductive covering layer containing carbon black on the exposed surface of the elastic foam.

As described above, an elastic layer including an elastic foam and a conductive covering layer covering the exposed surface of the elastic foam is obtained.

A conductive support member (made of stainless steel and having a diameter of 15 mm) coated on the surface thereof with adhesive is then inserted into the resulting elastic layer to form a roller member.

The elastic layer has a hysteresis loss of 27%.

Formation of Intermediate Layer

A coating liquid for forming an intermediate layer is obtained by mixing together 70 parts by mass of a urethane oligomer (urethane acrylate UV3700B, manufactured by Nippon Synthetic Chemical Industry Co., Ltd.), 30 parts by mass of a urethane monomer (isomyristyl acrylate, manufactured by Kyoeisha Chemical Co., Ltd.), 0.5 parts by mass of a polymerization initiator (1-hydroxycyclohexyl phenyl ketone Irgacure 184, manufactured by Ciba Specialty Chemicals Corporation), and 3 parts by mass of alkyltrimethylammonium perchlorate (the trade name "LXN-30", manufactured by Daiso Co., Ltd.). The resulting coating liquid for forming an intermediate layer is applied to the elastic layer using a die coater and is irradiated with UV light at a UV irradiation intensity of 700 mW/cm$^2$ for κ seconds while being rotated. By this procedure, an intermediate layer with a thickness of 1 mm is formed.

Formation of Surface Layer

A coating liquid for forming a surface layer is obtained by adding 5% by mass of a curing agent (WH-1, manufactured by Henkel Japan Ltd.) to a urethane resin coating material (EMRALON T-862A, manufactured by Henkel Japan Ltd.) and mixing them together. The resulting coating liquid for forming a surface layer is applied to the intermediate layer by spray coating, and the coating is cured by heating at 120° C. for 20 minutes to form a surface layer with a thickness of 20 μm.

As described above, Conductive Roller 1 including an elastic layer having a hysteresis loss of 27% is obtained.

Example 2

Conductive Roller 2 is obtained as in Example 1 except that RR80 (manufactured by Inoac Corporation) is used as an elastic foam.

The elastic layer has a hysteresis loss of 43%.

Example 3

Conductive Roller 3 is obtained as in Example 1 except that RR26 (manufactured by Inoac Corporation) is used as an elastic foam.

The elastic layer has a hysteresis loss of 28%.

Example 4

Conductive Roller 4 is obtained as in Example 1 except that SP80 (manufactured by Inoac Corporation) is used as an elastic foam.

The elastic layer has a hysteresis loss of 37%.

Example 5

Conductive Roller 5 is obtained as in Example 1 except that a cylindrical elastic foam is obtained using Endur (manufactured by Inoac Corporation) containing carbon black, and no conductive covering layer is formed.

The elastic layer has a hysteresis loss of 22%.

Example 6

Conductive Roller 6 is obtained as in Example 1 except that, in the formation of the elastic layer, a conductive treatment liquid is obtained using an aqueous dispersion containing 15% by mass of carbon black.

The elastic layer has a hysteresis loss of 30%.

Example 7

Conductive Roller 7 is obtained as in Example 1 except that, in the formation of the intermediate layer, tetraethylammonium chloride (manufactured by Tokyo Chemical Industry Co., Ltd.) is used as an ionic conductor.

The elastic layer has a hysteresis loss of 27%.

Example 8

Conductive Roller 8 is obtained as in Example 1 except that, in the formation of the surface layer, urethane dispersion UW-5002E (manufactured by UBE Corporation) is used as a urethane resin coating material.

The elastic layer has a hysteresis loss of 27%.

Comparative Example 1

Comparative Conductive Roller 1 is obtained as in Example 1 except that RR90 (manufactured by Inoac Corporation) is used as an elastic foam.

The elastic layer has a hysteresis loss of 45%.

Evaluation

Ease of Increasing Parallelism of Image Transferred to Recording Medium (Ease of Parallelism Adjustment)

A second transfer roller is mounted on ApeosPort VII C6688 manufactured by Fuji Xerox Co., Ltd. such that the depth of pressing of the second transfer roller against the opposing intermediate transfer belt is 0.2 mm on the rear side and 0.8 mm on the front side, that is, such that the difference in depth of pressing, (Rear)−(Front), is 0.6 mm. After a rectangular line with a size of 280 mm×400 mm is formed on the intermediate transfer belt, is transferred to A3 paper in the second transfer section, and is fixed in the fixing device, the image line lengths ($L_{Rear}$ and $L_{Front}$) on the rear and front sides of the resulting image are measured, and the difference in image line length, ΔL, from the original image length, i.e., 400 mm, is calculated as $(L_{Front})-(L_{Rear})$. A larger value of ΔL indicates that the parallelism of an image transferred to a recording medium is more easily adjusted to a higher value.

The evaluation scale is given below:

S: ΔL>2.0 mm

A: 1.5 mm<ΔL≤2.0 mm

B: 0.5 mm<ΔL≤1.5 mm

C: 0.5 mm≥ΔL

Back-Side Anti-Soiling Properties

After ApeosPort VII C6688 manufactured by Fuji Xerox Co., Ltd. is allowed to stand in an environment at 10° C. and 15% RH for 24 hours, a solid image with a density of 100% (25% for each of Y, M, C, and K) is directly transferred to a bias transfer roller (BTR), A3 paper is caused to run over the BTR, and the presence or absence of soiling on the back side is evaluated.

The evaluation scale is given below:

S: no soiling on the back side

A: very slight soiling on the back side (substantially no problem)

B: slight soiling on the back side (acceptable)

C: unacceptable soiling on the back side

TABLE 1

| | Elastomer model number | Conductive particle content of elastic layer | Hysteresis loss of elastic layer (%) | Density (kg/m$^3$) | Number of cells (cells/25 mm) | Ease of parallelism adjustment | Back-side anti-soiling properties |
|---|---|---|---|---|---|---|---|
| Example 1 | EP70 | 1% or less | 27 | 70 | 60 | S | S |
| Example 2 | RR80 | 1% or less | 43 | 72 | 50 | A | B |
| Example 3 | RR26 | 1% or less | 28 | 35 | 41 | A | S |
| Example 4 | SP80 | 1% or less | 37 | 73 | 80 | A | A |
| Example 5 | Endur | 1.1% or more | 22 | 65 | 38 | C | S |

TABLE 1-continued

| | Elastomer model number | Conductive particle content of elastic layer | Hysteresis loss of elastic layer (%) | Density ($kg/m^3$) | Number of cells (cells/25 mm) | Ease of parallelism adjustment | Back-side anti-soiling properties |
|---|---|---|---|---|---|---|---|
| Example 6 | EP70 | 1% or less | 30 | 69 | 60 | S | S |
| Example 7 | EP70 | 1% or less | 27 | 70 | 60 | S | S |
| Example 8 | EP70 | 1% or less | 27 | 70 | 60 | S | S |
| Comparative Example 1 | RR90 | 1% or less | 45 | 85 | 48 | C | C |

As can be seen from Table 1, the conductive rollers of the Examples have superior anti-soiling properties for the back side of a printed material to be obtained as compared to the conductive roller of the Comparative Example.

As can be seen from Table 1, the conductive rollers of the Examples also have superior ease of increasing the parallelism of an image to be obtained.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1))) A conductive roller comprising:
a support member;
an elastic layer disposed on an outer peripheral surface of the support member; and
a surface layer disposed on an outer peripheral surface of the elastic layer,
wherein the elastic layer includes a cylindrical elastic foam and a conductive covering layer covering an exposed surface of the elastic foam, and
wherein the elastic layer has a hysteresis loss of 44% or less.

(((2))) The conductive roller according to (((1))), wherein the elastic foam has a conductive particle content of 1% by mass or less based on a total mass of the elastic foam.

(((3))) The conductive roller according to (((2))), wherein the elastic foam has a conductive particle content of 0.1% by mass or less based on the total mass of the elastic foam.

(((4))) The conductive roller according to any one of (((1))) to (((3))), wherein the elastic foam has a density of 80 $kg/m^3$ or less.

(((5))) The conductive roller according to (((4))), wherein the elastic foam has a density of 30 $kg/m^3$ or more and 75 $kg/m^3$ or less.

(((6))) The conductive roller according to any one of (((1))) to (((5))), wherein a number of cells in the elastic foam is 20 cells/25 mm or more and 80 cells/25 mm or less.

(((7))) The conductive roller according to (((6))), wherein the number of cells in the elastic foam is 40 cells/25 mm or more and 65 cells/25 mm or less.

(((8))) The conductive roller according to any one of (((1))) to (((7))), wherein the elastic layer has a hysteresis loss of 40% or less.

(((9))) A transfer device comprising:
a transfer roller comprising the conductive roller according to any one of (((1))) to (((8))); and
a cleaning member in contact with the transfer roller.

(((10))) The transfer device according to (((9))), wherein the cleaning member is a plate-shaped cleaning member.

(((11))) A process cartridge attachable to and detachable from an image forming apparatus, the process cartridge comprising:
an image carrier;
a charging device that charges the image carrier; and the transfer device according to (((9))) or (((10))).

(((12))) An image forming apparatus comprising:
an image carrier;
a charging device that charges the image carrier;
a latent image forming device that forms a latent image on a charged surface of the image carrier;
a developing device that develops the latent image formed on the surface of the image carrier with a toner to form a toner image; and
the transfer device according to (((9))) or (((10))), wherein the transfer device transfers the toner image formed on the surface of the image carrier to a recording medium.

What is claimed is:

1. A conductive roller comprising:
a support member;
an elastic layer disposed on an outer peripheral surface of the support member; and
a surface layer disposed on an outer peripheral surface of the elastic layer,
wherein the elastic layer includes a cylindrical elastic foam and a conductive covering layer covering an exposed surface of the elastic foam, and
wherein the elastic layer has a hysteresis loss of 44% or less.

2. The conductive roller according to claim 1, wherein the elastic foam has a conductive particle content of 1% by mass or less based on a total mass of the elastic foam.

3. The conductive roller according to claim 2, wherein the elastic foam has a conductive particle content of 0.1% by mass or less based on the total mass of the elastic foam.

4. A transfer device comprising:
a transfer roller comprising the conductive roller according to claim 3; and
a cleaning member in contact with the transfer roller.

5. A transfer device comprising:
a transfer roller comprising the conductive roller according to claim 2; and
a cleaning member in contact with the transfer roller.

6. The transfer device according to claim 5, wherein the cleaning member is a plate-shaped cleaning member.

7. The conductive roller according to claim 1, wherein the elastic foam has a density of 80 $kg/m^3$ or less.

8. The conductive roller according to claim 7, wherein the elastic foam has a density of 30 $kg/m^3$ or more and 75 $kg/m^3$ or less.

9. A transfer device comprising:
a transfer roller comprising the conductive roller according to claim 8; and
a cleaning member in contact with the transfer roller.

10. A transfer device comprising:
a transfer roller comprising the conductive roller according to claim 7; and
a cleaning member in contact with the transfer roller.

11. The conductive roller according to claim 1, wherein a number of cells in the elastic foam is 20 cells/25 mm or more and 80 cells/25 mm or less.

12. The conductive roller according to claim 11, wherein the number of cells in the elastic foam is 40 cells/25 mm or more and 65 cells/25 mm or less.

13. A transfer device comprising:
a transfer roller comprising the conductive roller according to claim 12; and
a cleaning member in contact with the transfer roller.

14. A transfer device comprising:
a transfer roller comprising the conductive roller according to claim 11; and
a cleaning member in contact with the transfer roller.

15. The conductive roller according to claim 1, wherein the elastic layer has a hysteresis loss of 40% or less.

16. A transfer device comprising:
a transfer roller comprising the conductive roller according to claim 15; and
a cleaning member in contact with the transfer roller.

17. A transfer device comprising:
transfer roller comprising the conductive roller according to claim 1; and
a cleaning member in contact with the transfer roller.

18. The transfer device according to claim 17, wherein the cleaning member is a plate-shaped cleaning member.

19. An image forming apparatus comprising:
an image carrier;
a charging device that charges the image carrier;
a latent image forming device that forms a latent image on a charged surface of the image carrier;
a developing device that develops the latent image formed on the surface of the image carrier with a toner to form a toner image; and
transfer device according to claim 17, wherein the transfer device transfers the toner image formed on the surface of the image carrier to a recording medium.

20. The conductive roller according to claim 1, wherein the conductive roller is configured to transfer a toner image formed on a surface of an image carrier to a surface of a recording medium.

* * * * *